(12) United States Patent
Heidenreich et al.

(10) Patent No.: US 6,305,515 B1
(45) Date of Patent: Oct. 23, 2001

(54) HYDRAULICALLY ACTUATED POWER TAKEOFF CLUTCH ASSEMBLY

(75) Inventors: David C. Heidenreich, Akron; Robert E. Herchick, Copley; Joseph W. Guinter, Bay Village, all of OH (US)

(73) Assignee: Power Transmission Technology, Inc., Sharon Center, OH (US)

( * ) Notice: Subject to any disclaimer, the term of this patent is extended or adjusted under 35 U.S.C. 154(b) by 0 days.

(21) Appl. No.: 09/357,488

(22) Filed: Jul. 20, 1999

(51) Int. Cl.[7] ................................................. F16D 13/22
(52) U.S. Cl. ..................... 192/18 A; 192/103 F; 192/70.12; 192/85 AA; 192/30 W; 192/30 V; 192/209; 192/113.34; 192/109 F
(58) Field of Search ............................. 192/18 A, 103 F, 192/70.12, 85 AA, 30 W, 30 V, 209, 113.34, 112, 109 F

(56) References Cited

U.S. PATENT DOCUMENTS

| | | | | |
|---|---|---|---|---|
| 4,488,626 | * | 12/1984 | Handke | 192/70.12 |
| 4,574,926 | * | 3/1986 | Bubak | 192/18 A |
| 4,629,050 | * | 12/1986 | Valier | 192/113.34 |
| 4,720,929 | * | 1/1988 | Umberson | 192/70.12 X |
| 5,261,517 | * | 11/1993 | Hering | 192/91 A |
| 5,769,187 | * | 6/1998 | Sommer | 192/18 A X |
| 6,041,903 | * | 3/2000 | Burns et al. | 192/85 AA |
| 6,076,646 | * | 6/2000 | Burns | 192/85 AA |

* cited by examiner

Primary Examiner—Charles A Marmor
Assistant Examiner—Saúl Rodríguez
(74) Attorney, Agent, or Firm—Renner, Kenner, Greive, Bobak, Taylor & Weber

(57) ABSTRACT

A hydraulically actuated power takeoff clutch assembly is rigidly coupled to the flywheel of an engine and has an input hub which serves as a gear to drive auxiliary hydraulic pumps. The input hub is a portion of a wet clutch which is hydraulically actuated through a rotary union connected to an output shaft. The serviceable parts of the clutch are secured to the output shaft and are separably removable from the hydraulic power takeoff assembly for servicing. The clutch is of a multiple disk type. An electronic controller monitors the input and output speeds of the hydraulic power takeoff device and is effective to "bump" the unit to accomodate high inertia loads and to further monitor the operation of the device, such that the clutch thereof serves as a torque limiter.

22 Claims, 5 Drawing Sheets

HYDRAULICALLY ACTUATED POWER TAKEOFF CLUTCH ASSEMBLY

TECHNICAL FIELD

The invention herein resides in the art of power transmission devices and, more particularly, to couplers between a power source and a power driven implement. More particularly, the invention relates to power takeoff units. Specifically, the invention relates to a hydraulic power takeoff clutch assembly adapted to be driven by the flywheel of an engine and which is hydraulically actuated, and adapted to provide power not only from a rotating output shaft, but through hydraulic pumps driven by the input, as well.

BACKGROUND OF THE INVENTION

The use of clutches of various types to couple power from a power source such as an engine to auxiliary pieces of equipment is commonly known. Presently, over center mechanical engine clutches are often used to couple the flywheel of an engine to an auxiliary piece of equipment. Such clutches suffer from a number of problems, including pilot bearing failures, excessive wear, frequent adjustment and maintenance and operator abuse while attempting to achieve engagement when the clutch is coupling the engine with a high inertia load such as crushers and hammer mills. Indeed, in view of the state of the prior art, there is a need for a hydraulically actuated, wet multiple disk clutch to serve as a power takeoff unit between an engine and a high inertia load. Moreover, there is a need in the art for such a power takeoff unit which can serve as a torque limiter, while also providing a means for driving auxiliary hydraulic pumps. Further, there remains a need in the art for such a power takeoff unit which may easily and effectively be engaged to connect a high inertia load.

DISCLOSURE OF INVENTION

In light of the foregoing, it is a first aspect of the invention to provide a hydraulically actuated power takeoff clutch unit in which the input end of the clutch thereof is rigidly and directly coupled to the engine flywheel, without the need for bearing support of the clutch input.

Still a further aspect of the invention is the provision of a hydraulically actuated power takeoff clutch unit which includes a gear on the input of the clutch assembly which may be employed to drive hydraulic pumps for powering auxiliary equipment, or for actuating the hydraulically actuated power takeoff clutch unit itself.

Yet another aspect of the invention is the provision of a hydraulically actuated power takeoff clutch unit which provides for ease of removal of a clutch module while allowing the remainder of the unit to stay secured to the engine itself, thus allowing for servicing of the clutch assembly without removal of the entirety of the power takeoff clutch unit and pump drives from the engine.

Yet a further aspect of the invention is the provision of a hydraulically actuated power takeoff clutch unit which employs an automatic brake structure which retards rotation of the output shaft except when the clutch is engaged.

Still another aspect of the invention is the provision of a hydraulically actuated power takeoff clutch unit which employs a rotary union for coupling hydraulic, cooling and lubricating fluids to the clutch assembly.

Still a further aspect of the invention is to provide a hydraulically actuated power takeoff clutch unit which is electronically controlled so as to achieve effective start-up and controlled operation.

Yet a further aspect of the invention is to provide a hydraulically power takeoff clutch unit which is reliable and durable in operation, readily constructed from state of the art components, and readily adapted to implementation with existing equipment.

The foregoing and other aspects of the invention which will become apparent as the detailed description proceeds are achieved by a power takeoff clutch unit for interconnection with a flywheel of an engine, comprising: an adapter plate secured to and driven by the flywheel; an input hub assembly connected to and driven by said adapter plate; an output hub assembly; an output shaft interconnected with said output hub assembly and rotatable therewith; a fluid actuated clutch assembly interposed between said input hub assembly and said output hub assembly, said clutch assembly selectively interengaging said input and output hubs; and a seal maintained upon said input hub assembly to maintain oil within the unit.

Other aspects of the invention which will become apparent herein are attained by the hydraulic power takeoff clutch unit presented above, and further comprising a housing encasing said input hub assembly, and wherein said input hub assembly further comprises a gear hub having a gear defined about an outer circumference thereof.

Yet other aspects of the invention which will become apparent herein are achieved by the power takeoff unit presented above, and further comprising: a housing adapted to be secured to the engine, said housing maintaining said clutch assembly; an annular end cover removably secured to said housing, said output shaft passing through said end cover; and wherein said clutch assembly is secured to said output shaft, such that said end cover, clutch assembly and output shaft are separable from said housing as a unit.

Still further aspects of the invention which will become apparent herein are attained by the power takeoff clutch unit presented above, further comprising: an input speed sensor producing a first output signal corresponding to the instantaneous rotational speed of the flywheel; an output speed sensor producing a second output signal corresponding to the instantaneous rotational speed of the output shaft; a hydraulic valve in selective communication with said clutch assembly; a lubrication valve in selective communication with said clutch assembly; and a control unit interposed among said input and output speed sensors and said hydraulic and lubrication valves, said control unit effecting engagement and disengagement of said clutch assembly through said hydraulic valve as a function of said first and second output signals.

DESCRIPTION OF THE DRAWINGS

For a complete understanding of the objects, techniques and structure of the invention reference should be made to the following detailed description and accompanying drawings wherein.

BEST MODE FOR CARRYING OUT THE INVENTION

Figure 1:
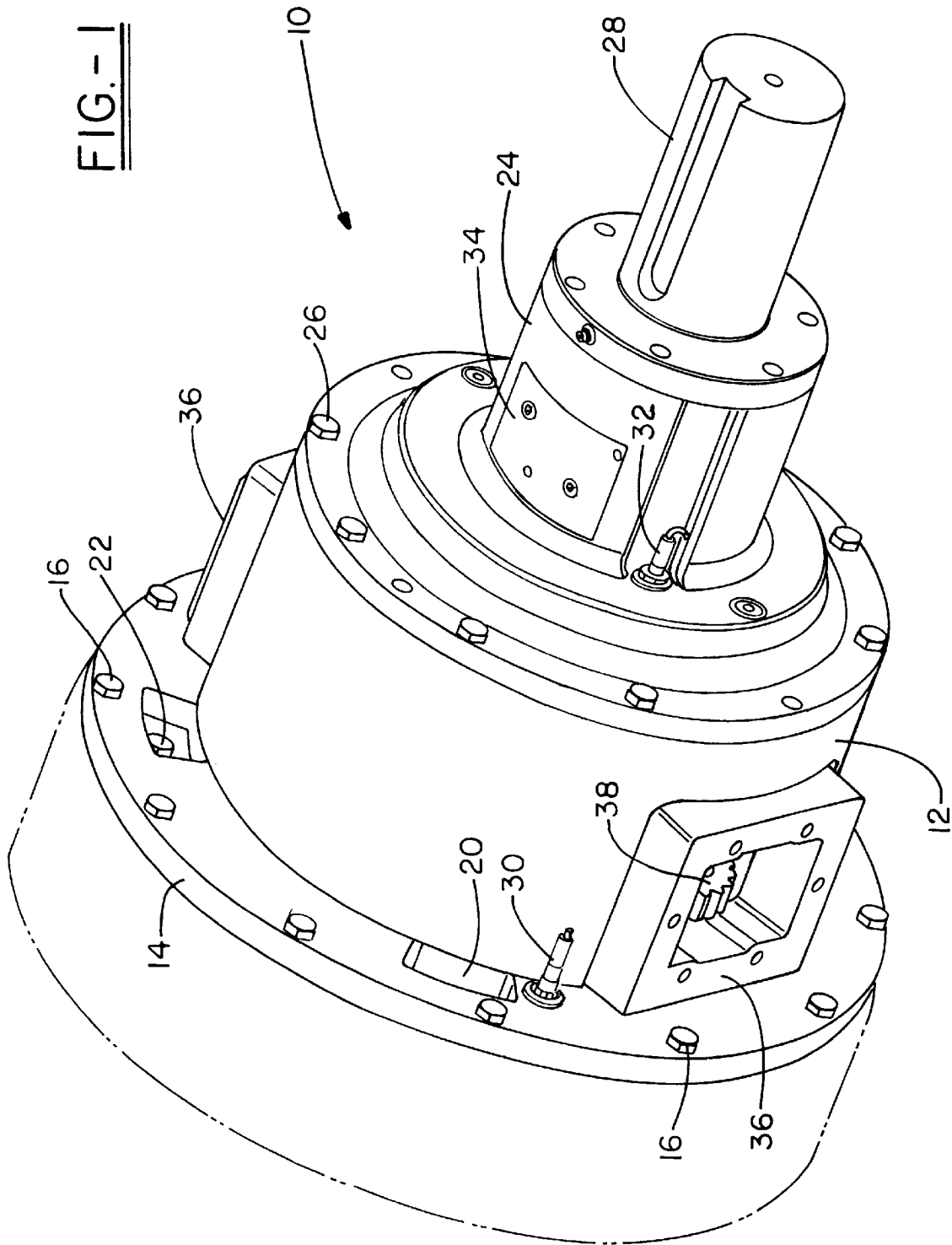
FIG. 1 is a perspective view of the external structure of the hydraulic power takeoff assembly according to invention.

Referring now to the drawings and more particularly FIG. 1, it can be seen that a hydraulically actuated power takeoff clutch assembly according to the invention is designated generally by the numeral 10. The assembly 10 includes a cylindrical housing 12 received by an annular disk-shaped housing adapter 14 which, in turn, is secured by bolts 16 to a flywheel housing 18. It will be appreciated by those skilled in the art that the flywheel housing 18 is part and parcel of an appropriate drive engine or other power source and retains therein a flywheel to be discussed later herein.

The housing adapter 14 is characterized by a plurality of openings 20 providing exposure to bolts 22 employed for securing the hydraulic power takeoff assembly 10 to the engine flywheel as will be discussed below.

An end cover or bearing cover 24 is secured to the cylindrical housing 12 by bolts 26 or other suitable fasteners. Extending from the bearing cover 24 is a power output shaft 28 which may be secured to any appropriate implement to be coupled to an engine by the hydraulically actuated power takeoff clutch assembly 10. One specific adaptation of the instant invention is to drive a tub grinder thereby.

It will be appreciated that the hydraulically actuated power takeoff clutch assembly 10 is uniquely adapted for electronic control and/or monitoring, and is further configured to receive and drive an auxiliary hydraulic pump or the like. In this regard, an input speed sensor or transducer 30 is received by the housing adapter 14 and communicates with the engine flywheel to monitor the input speed to the assembly 10 from the flywheel. It will be appreciated that the speed sensor 30 may simply be the tachometer or speed sensor of the engine itself. Such instantaneous speed is presented as an electrical output signal by the transducer 30. In like manner, an output speed sensor or transducer 32 may also be provided in association with the assembly 10 and in communication with the output shaft 28 to provide an electrical signal corresponding to the instantaneous rotational speed of the output shaft 28. The output signals from the transducers 30, 32 are received and employed by a controller in a manner to be discussed herein. As also shown in FIG. 1, a mounting pad 34 is provided for receipt of actuation and lubrication valves for communication through a rotary union to the clutch assembly of the hydraulic power takeoff assembly 10. While the invention contemplates that such valves may be received directly upon the mounting pad 34, it is also contemplated that the valves may be maintained separate and apart from the assembly 10. Also contemplated as a part of the instant invention are gear pump drive mounting pads 36, each providing access to an idler gear assembly 38, driven by the input to the clutch unit of the hydraulically actuated power takeoff clutch assembly 10, as will be discussed below. In other words, each of the pads 36 may receive a hydraulic pump and drive assembly effectively driven by the input to the hydraulically actuated power takeoff clutch assembly 10, such hydraulic pumps being used to drive auxiliary equipment or to be used for the source of power actuation of the clutch of the assembly 10, itself.

Figure 2:
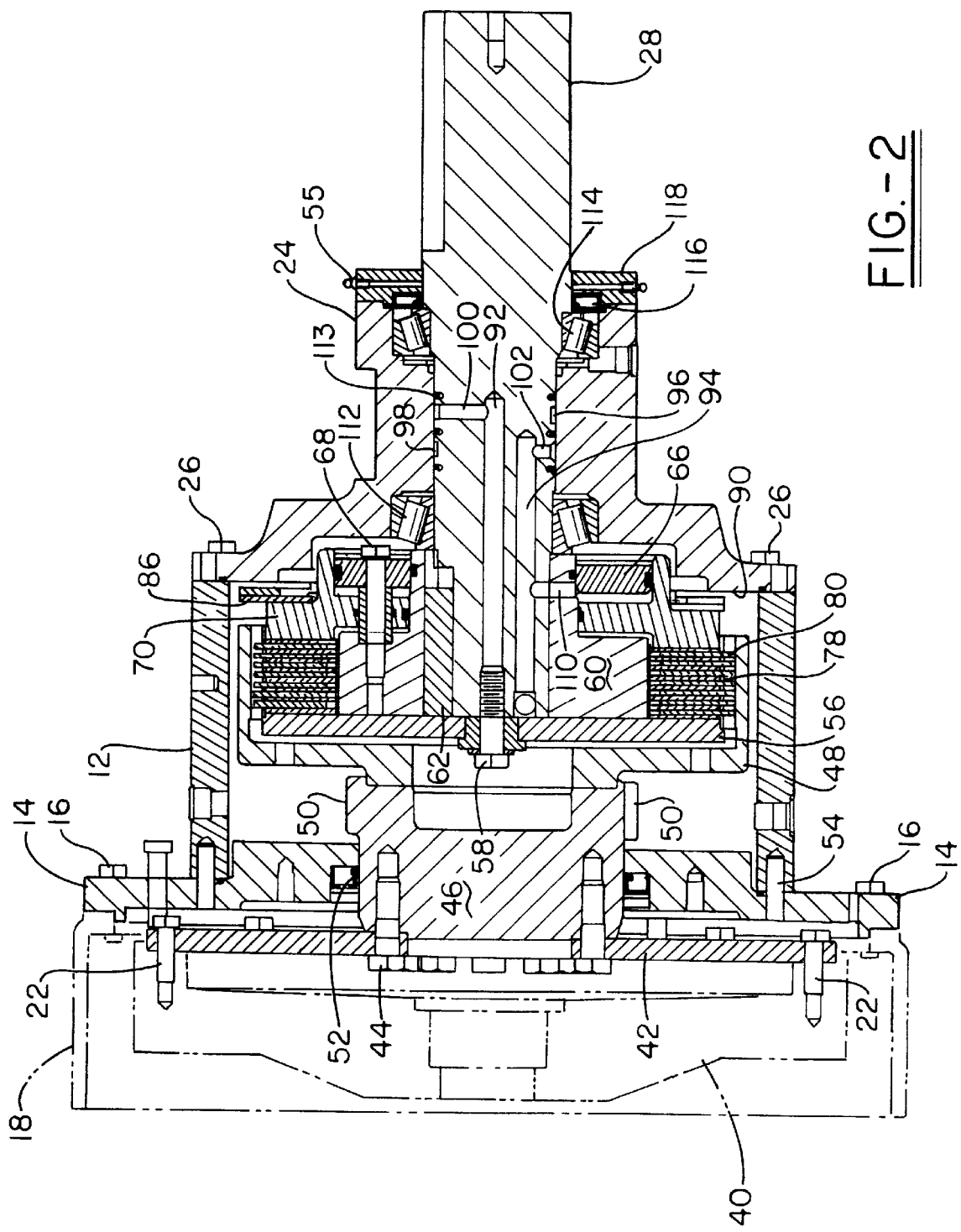
FIG. 2 is a central cross sectional view of the hydraulic power takeoff assembly of FIG. 1.

Referring now to FIG. 2, it can be seen that a flywheel 40 of an associated engine or appropriate power source is maintained within the housing 18 thereof and is secured by means of bolts 22 to a rigid adapter plate 42. In turn, the adapter plate 42 is secured by bolts 44 directly to a clutch input hub 46. Lockingly secured to the input hub 46, by bolts or other appropriate means, is a clutch cup 48. It will be appreciated that the clutch hub 46 and cup 48 are preferably integral, but are formed separately and secured together for purposes of manufacturing convenience.

As just presented, flywheel 40 is connected directly to the input hub 46 through a rigid adapter plate 42, and without any bearings or other support interface between the flywheel 40 and the hydraulic power takeoff assembly 10. In effect, the assembly 10 employs the bearings and support structure of the flywheel 40 and associated engine, rather than employing bearings and support structure internal to the assembly 10, to support the input and save both space and cost.

Figure 8:
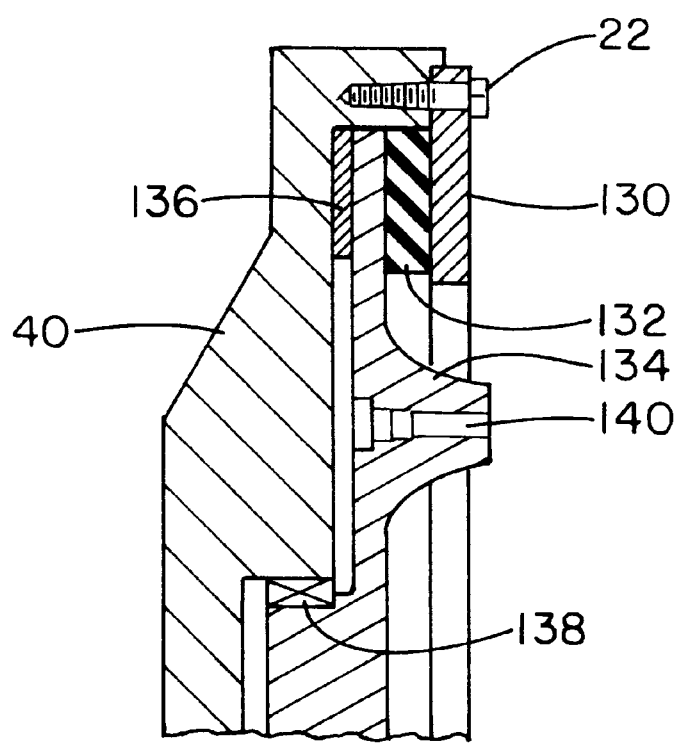

As shown in FIG. 8, the rigid adapter plate 42 may be replaced with an adapter plate that is rigid in all respects, except torsionally, to absorb vibrations characteristic of certain applications. This alternative coupling includes a compression plate 130 that bolts to the engine flywheel. This plate 130 compresses an elastomeric ring of material 132 against the adapter plate 134 which has a ring of friction material 136 bonded to it to create a resistive torque against the flywheel 40. This resistive torque absorbs vibration energy when high vibration or torque reversals are experienced in the coupling. The compressive forces of the elastomeric material 132 also maintain the squareness of the adapter plate 134 to the flywheel 40 to take the drive loads. The adapter plate 134 has a bearing 138 that fits into the standard pilot bearing bore of the flywheel to maintain concentricity of the adapter plate and restrain the loads from the drives. Thus the coupling is rigid in all respects except torsionally. As shown, bolts 140 or appropriate fasteners secure the adapter plate 134 to the clutch input hub 46.

Figure 3:
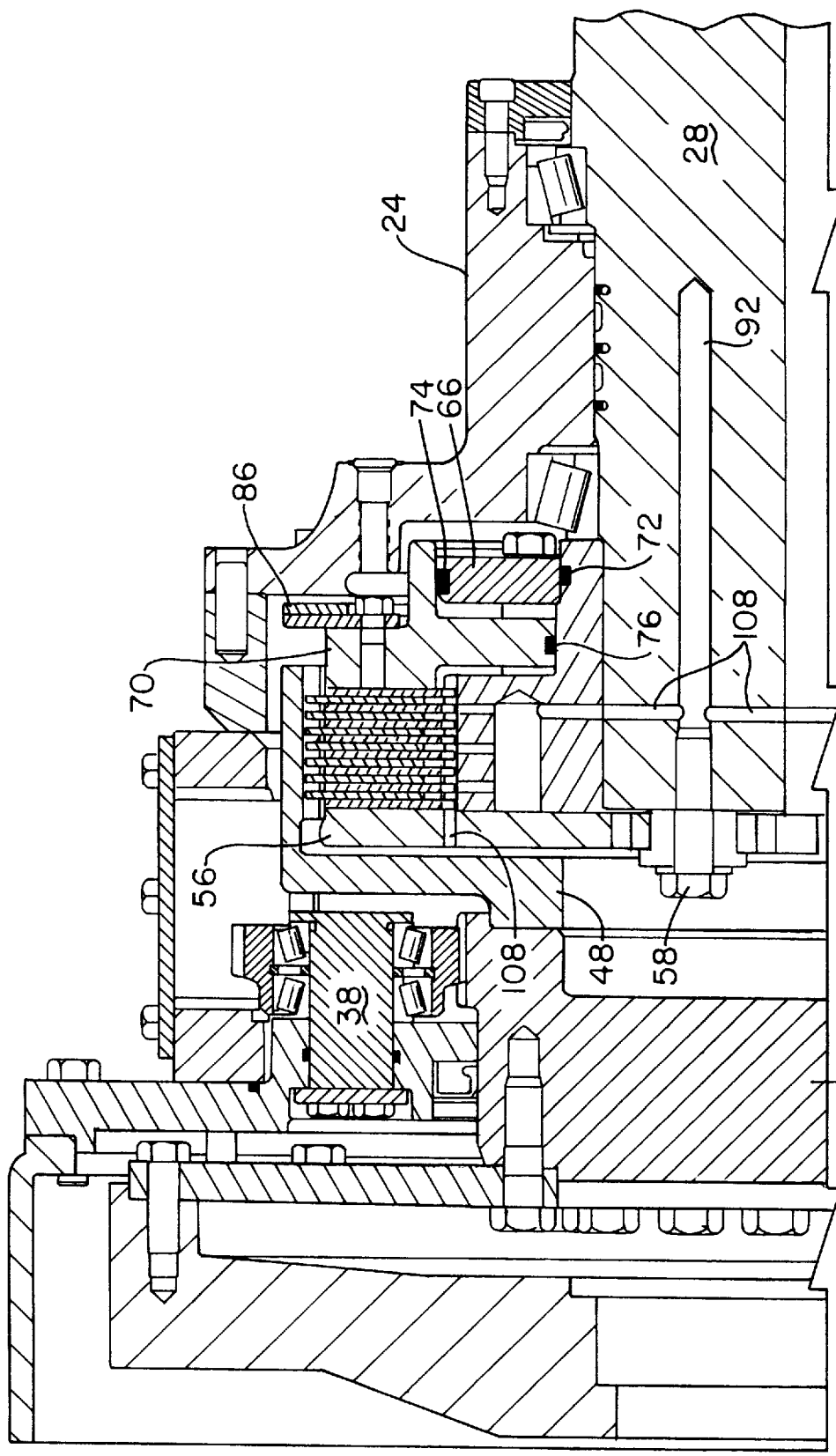
FIG. 3 is a partial cross sectional view of the hydraulic power takeoff assembly according to the invention.

As further shown in FIG. 2, input hub 46 is characterized by a plurality of circumferential gear teeth 50 such that the hub 46 operates as a gear to engage the idler gear assemblies 38 (best shown in FIGS. 1 and 3). Accordingly, the idler gear assemblies 38 are driven by an input tied directly to the flywheel 40 of the engine and are thus available to directly drive hydraulic pumps or the like mounted to the pads 36. These pumps may be employed to control auxiliary hydraulic equipment or as a power source for engaging the clutch of the assembly 10, as will be apparent below.

As further shown, an appropriate seal 52 is interposed between the housing adapter 14 and clutch input hub 46. Additionally, dowel pins 54 are provided for securing the cylindrical housing 12 to the housing adapter plate 14, as illustrated. An end plate 56 is received within the clutch cup 48 and is secured by bolts 58 to the output shaft 28. An output hub 60 is received upon the output shaft 28 and is keyed thereto by an appropriate key 62. Accordingly, the output hub 60 is operative to rotationally drive the output shaft 28.

A backplate 66 is secured to the output hub 60 by means of bolts or cap screws 68, as shown. A piston or pressure plate 70 is interposed between the output hub 60 and back plate 66 and is operative to actuate the clutch of the assembly 10 in a manner to be presented directly below.

As best shown in FIG. 3, a plurality of O-ring seals 72, 74, 76 are interposed between the backplate 66, piston 70 and output hub 60 for purposes of sealing the hydraulic fluid employed to actuate the clutch from the lubrication fluid of the wet clutch assembly.

As shown in FIG. 2, the clutch of the hydraulically actuated power takeoff clutch assembly 10 is configured of a plurality of alternatingly interleaved friction plates or disks 78 and separator plates or disks 80. In the preferred embodiment of the invention, the friction disks 78 are keyed or splined to the output hub 60, while the separator disks 80 are keyed or splined to the clutch cup 48. As will be appreciated by those skilled in the art, when hydraulic pressure is applied to the piston or pressure plate 70 in the annular cavity defined between the backplate 66 and piston 70, the piston 70 urges the disks 78, 80 of the clutch stack together, thus engaging the clutch and causing the output shaft 28 and flywheel 40 to rotate together, and at the same rotational speed.

Figure 4:
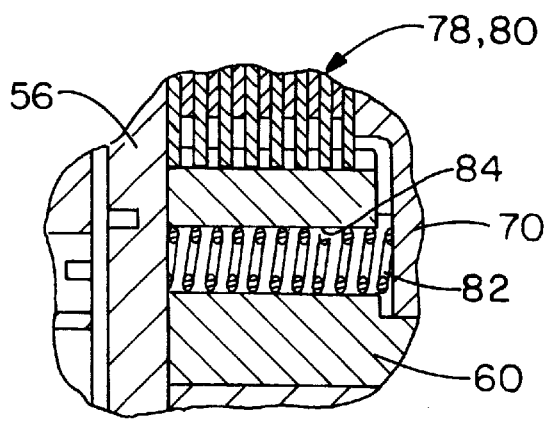
FIG. 4 is a partial cross sectional view of the hydraulic power takeoff assembly according to the invention, and showing the return spring mechanism for the clutch thereof.

When hydraulic pressure against the piston 70 is released, it is desired that the clutch disengage and that the interleaved friction and separator disks 78, 80 be relatively freewheeling. To achieve this separation and return of the piston 70, return springs are employed. As shown in FIG. 4, return springs 82 are received within bores 84 within the output hub 60 and extend between the end plate 56 and piston 70. The return springs 82 urge the pistons 70 toward the backplate 66 and into a position of disengagement of the clutch. Accordingly, when hydraulic pressure is released from the backside of the piston 70, the return springs 82 urge the piston away from the clutch stack 78, 80, allowing the disks thereof to become freewheeling and resulting in clutch disengagement. While the invention herein is discussed with respect to hydraulic actuation and control, it will be appreciated that pneumatic actuation and control would be employed in the context of the invention, as well.

It is most desirable that there be no incidental or inadvertent rotation of the output shaft 28 when the piston 70 is not engaging the stack 78, 80. Indeed, it has been found that in a wet clutch assembly, the viscosity of the lubricating oil within the stack itself is, at certain low temperatures, sufficient to effect passive engagement of the clutch such that some rotation of the output shaft 28 may occur. To prevent this inadvertent rotation, the instant invention contemplates the utilization of an annular brake disk 86 secured by cap screws 88 to the backside of the piston 70, as shown. When the clutch is not engaged, the return springs 82 urge the piston 70 toward the backplate 66 and to a point where the annular brake disk 86 frictionally engages an inside annular flat surface 90 of the bearing cover 24. Accordingly, the piston 70 is braked when the clutch is disengaged. With the piston 70 being secured by the cap screw 68 to the output hub 60, any inadvertent or incidental rotation of the output shaft 28 is retarded. In other words, the braking of the piston 70 effects braking of the output shaft 28.

With the clutch of the hydraulically actuated power takeoff clutch assembly 10 being a hydraulically actuated wet clutch, the invention requires means for conveying lubrication, cooling and actuation fluid from the housing or casing of the assembly 10 to the interior thereof. In this regard, a bore 92 for conveying lubrication and cooling fluid is axially configured in the output shaft 28. Similarly, a bore 94 for conveying actuation fluid is defined in the output shaft in parallel relationship with the bore 92. Circumferential grooves 96, 98 are provided about the output shaft 28 in spaced apart relationship, as shown. The groove 96 communicates through a radial inlet bore 100 with the lubrication and cooling bore 92, while the circumferential groove 98 communicates through a radial inlet bore 102 with the hydraulic actuation bore 94.

Figure 5:
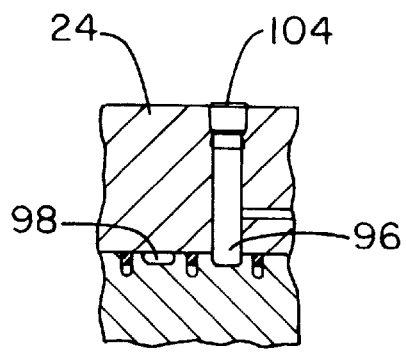
FIG. 5 is a partial cross sectional view of the rotary union inlet for lubrication of the clutch assembly of the invention.
Figure 6:
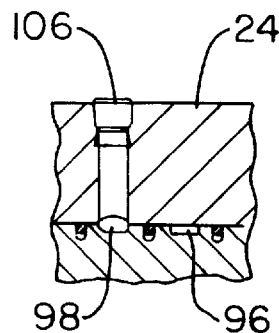
FIG. 6 is a cross sectional view of the actuation inlet for the clutch assembly of the invention.

It will be appreciated that the passage of actuation, lubrication and cooling fluid or oil from external to the hydraulically actuated power takeoff clutch assembly 10 to the interior thereof is achieved by a rotary union. The circumferential grooves 96, 98 in the circumferential surface of the rotating output shaft 28 communicate with inlets in the bearing cover 24. As shown in FIG. 5, an inlet 104 passes through the bearing cover 24 and communicates with the circumferential groove 96 carrying lubrication fluid. In like manner, an inlet 106 passes through the bearing cover 24 and communicates with the circumferential groove 98 to convey hydraulic fluid. As shown in FIG. 3, the lubricating fluid which is introduced into the bore 92 passes through lubrication paths 108 to the disk stack 78, 80 comprising the clutch of the hydraulic power takeoff assembly 10. The paths 108 assure that cooling fluid reaches the clutch stack and lubricates the associated bearings of the clutch assembly, as would be readily appreciated by those skilled in the art. As shown in FIG. 2, the hydraulic fluid introduced through the input 106 and into the bore 94 passes through a bore 110 to introduce the pressurized hydraulic fluid into the cavity between the backplate 66 and piston 70.

With further reference to FIG. 2, it can be seen that tapered roller bearings 112, 114 are interposed between the bearing cover 24 and output shaft 28 for purposes of supporting and maintaining the rotating shaft 28. In the preferred embodiment of the invention, the tapered roller bearings 112, 114 are spring biased to prevent axial movement or vibration which would adversely affect the rotary union at the seals 113 associated with the circumferential grooves 96, 98 and inlets 102, 104.

A shaft seal 116 is provided about the shaft 28 and an end of the bearing cover 24 and is retained there by an end collar or seal cover 118. It will be readily appreciated by those skilled in the art that a number of other internal seals are employed in the context of the invention as shown in the drawings but not described. Their implementation, positioning and use would be readily appreciated by those skilled in the art and such is not critical for an understanding or appreciation of the concept of the instant invention.

It should be readily appreciated that the hydraulically actuated power takeoff clutch assembly 10 is secured to the flywheel housing 18 of an engine or other power source by means of bolts 16, or the like. At times, however, servicing of the clutch assembly, to repair worn parts and the like, may be desired. It is most advantageous in this regard for the clutch assembly be removable from the hydraulically actuated power takeoff clutch assembly 10, without necessitating removal of the assembly 10 from the flywheel housing 18 and without disturbing the associated pumps and hoses. In this regard, it will be appreciated that removal of the bolts 26 allows for removal of the shaft 28, bearing cover 24, clutch plates 78, 80, piston 70 and backplate 66, all retained to the shaft 28 by means of the end plate 26 and bolt 58. Servicing of that clutch module may then be easily undertaken and replacement thereof easily achieved in the field.

Figure 7:
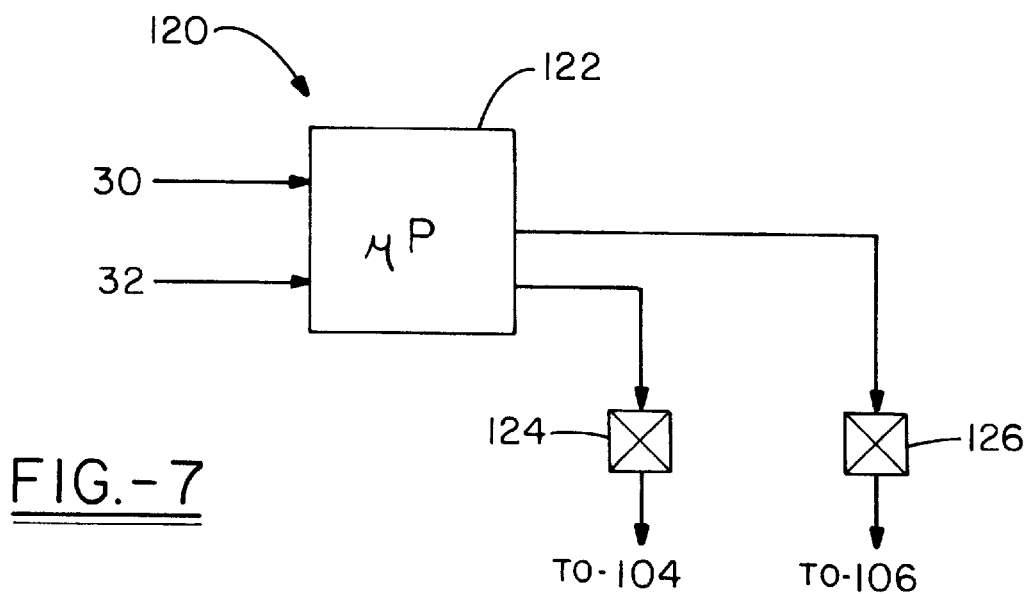
FIG. 7 is a schematic diagram of the control unit of the invention.

It is contemplated that the hydraulically actuated power takeoff clutch assembly 10 of the invention is electronically controlled as by a control circuit 120 shown in Fig. 7. As illustrated therein, a microprocessor or control chip 122 receives input signals from the speed transducers 30, 32 respectively corresponding to the instantaneous speed of the flywheel 40 and output shaft 28. The microprocessor 122 also controls a control valve 124 which is connected to the inlet 104 to provide lubrication to the clutch, seals and bearings of the assembly 10. Similarly, the control chip 122 regulates a control valve 126 for selectively applying hydraulic pressure through the inlet 106 to the piston or pressure plate 70 to control actuation of the clutch.

It will be readily appreciated by those skilled in the art that the utilization of a microprocessor or controller chip 122 allows the hydraulically actuated power takeoff clutch assembly 10 to couple high inertia loads to an engine and to effect a start up without stalling the engine. In that regard, the microprocessor 122 can momentarily actuate the clutch 78, 80 by momentarily opening the valve 126 to start rotation of the shaft 28. If the speed sensor 32 senses that the shaft 28 has not commenced a rotational speed of a particular threshold, it may determine that the shaft 28 is jammed or otherwise locked and may signal the operator accordingly. If the shaft 28 has begun to rotate, the microprocessor 122 may cause the valve 126 to again open momentarily to "bump" the clutch again to impart more speed to the shaft 28 and, upon sensing that the speed of the shaft has increased further, the microprocessor 122 may then effect full closure of the clutch to bring the output shaft 28 up to the rotational speed of the flywheel 40.

Various types of start-up routines could be envisioned by those skilled in the art to ensure that the shaft 28 is brought up to an operational speed without excessively loading or stalling the engine.

It is also contemplated that only the speed sensor 30, which could be simply the engine tachometer, may be employed and monitored for the engagement technique. Here, the microprocessor 122, upon sensing that the engine (flywheel) speed has dropped below a threshold, may cause the clutch to momentarily disengage, allowing the engine speed to recover and the clutch to cool prior to subsequent reengagements or bumping until the engine speed does not drop below the threshold, but accelerates to its operational speed.

The speed sensors 30, 32 can also be employed to monitor any slippage of the disks of the clutch 78, 80. It will be appreciated by those skilled in the art that the clutch 78, 80 serves as a rudimentary torque limiting clutch, having a characteristic break-away torque dependent upon the frictional characteristics of the disks 78, 80 and the applied hydraulic pressure. The speed transducers 30, 32 allow the microprocessor 122 to monitor any slippage in the clutch and to take any necessary remedial action.

Thus it can be seen that the objects of the invention have been satisfied by the structure presented above. While in accordance with the patent statutes, only the best mode and preferred embodiment of the invention has been presented and described in detail, the invention is not limited thereto or thereby. Accordingly, for an appreciation of the true scope and breadth of the invention reference should be made to the following claims.

What is claimed is:

1. A power takeoff clutch unit in interconnection with a flywheel of an engine, comprising:
    a stationary flywheel housing maintaining the flywheel of an engine therein;
    an adapter plate secured to and driven by the flywheel;
    an input hub assembly connected to and driven by said adapter plate;
    an output hub assembly;
    an output shaft interconnected with said output hub assembly and rotatable therewith;
    a fluid actuated clutch assembly interposed between said input hub assembly and said output hub assembly, said clutch assembly selectively inter-engaging said input and output hubs; and
    a seal maintained upon said input hub assembly to maintain oil within the unit.

2. The power take off clutch unit according to claim 1, wherein said adapter plate is rigidly secured to said flywheel.

3. The power takeoff clutch unit according to claim 2, wherein said input hub assembly is connected rigidly to said adapter plate, there being no bearings within said power takeoff unit supporting said input hub assembly.

4. The power takeoff clutch unit according to claim 1, further comprising a housing encasing said input hub assembly, and wherein said input hub assembly further comprises a gear hub having a gear defined about an outer circumference thereof.

5. The power takeoff clutch unit according to claim 4, further comprising an idler gear assembly received within said housing and in driven engagement with said gear hub gear.

6. The power takeoff clutch unit according to claim 5, wherein said housing has at least one opening therein exposing said idler gear assembly, and a pad surrounding said opening for receiving a hydraulic pump and drive assembly.

7. The power takeoff unit according to claim 1, further comprising:
    a housing adapted to be secured to the engine, said housing maintaining said clutch assembly;
    an annular end cover removably secured to said housing, said output shaft passing through said end cover; and
    wherein said clutch assembly is secured to said output shaft, such that said end cover, clutch assembly and output shaft are separable from said housing as a unit.

8. The power takeoff clutch unit according to claim 7, wherein said annular end cover is bolted to said housing.

9. The power takeoff clutch unit according to claim 8, wherein said clutch assembly is secured by an end plate to said output shaft.

10. The power takeoff clutch unit according to claim 8, wherein said clutch assembly comprises a plurality of alternatingly interleaved friction and spacer disks interconnected with said input and output hub assemblies.

11. The power takeoff clutch unit according to claim 1, wherein said clutch assembly comprises:
    an end plate;
    a piston;
    a plurality of alternatingly interleaved friction and separator disks interposed between said end plate and said piston; and
    a friction brake disk secured to said piston on a side of said piston opposite said plurality of interleaved friction and separator disks.

12. The power takeoff clutch unit according to claim 11, further comprising an enclosed housing maintaining said clutch assembly, and wherein return springs engage said piston and urge it away from said interleaved friction and spacer disks and toward said housing to effect engagement of said friction brake disk with said housing.

13. The power takeoff clutch unit according to claim 12, wherein said return springs are maintained within said output hub.

14. The power takeoff clutch unit according to claim 1, further comprising:
    an input speed sensor producing a first output signal corresponding to the instantaneous rotational speed of the flywheel;
    an output speed sensor producing a second output signal corresponding to the instantaneous rotational speed of the output shaft;

a hydraulic valve in selective communication with said clutch assembly;

a lubrication valve in selective communication with said clutch assembly; and a control unit interposed among said input and output speed sensors and said hydraulic and lubrication valves, said control unit effecting engagement and disengagement of said clutch assembly through said hydraulic valve as a function of said first and second output signals.

15. The power takeoff clutch unit according to claim 14, wherein said control unit effects engagement of said clutch assembly by momentarily engaging said clutch assembly and monitoring said second output signal and thereafter effecting continued engagement of said clutch assembly when said second output signal indicates that said output shaft is not overloaded.

16. The power takeoff clutch unit according to claim 15, wherein said control unit monitors said first and second signals and repeatedly momentarily engages said clutch assembly to effect convergence of said rotational speed of said output shaft with said rotational speed of said flywheel.

17. The power takeoff clutch unit according to claim 1, further comprising:

an engine speed sensor producing an output signal corresponding to the instantaneous rotational speed of the flywheel; and a control unit interposed between said engine speed sensor and said fluid actuated clutch assembly, said control unit effecting engagement and disengagement of said clutch assembly as a function of said output signal.

18. The power takeoff clutch unit according to claim 1, wherein said adapter plate is secured to the flywheel by a compression plate fixed to the flywheel, said compression plate compressing an elastomeric material against said adapter plate and urging said adapter plate into engagement with the flywheel.

19. The power takeoff clutch unit according to claim 18, wherein said adapter plate has a friction material bonded thereto and in engagement with the flywheel.

20. The power takeoff clutch unit according to claim 19, further comprising a bearing interposed between said adapter plate and the flywheel.

21. The power takeoff clutch unit according to claim 1, further comprising a pair of spring biased tapered roller bearings receiving said output shaft, and a hydraulic rotary union interposed between said pair of spring biased tapered roller bearings, said hydraulic rotary union supplying hydraulic fluid to said fluid actuated clutch assembly.

22. The power takeoff clutch unit according to claim 21, further comprising a lubricating and cooling rotary union interposed between said pair of spring biased tapered roller bearings and supplying lubricating and cooling oil to said clutch assembly.

* * * * *